(12) United States Patent
Collingbourne et al.

(10) Patent No.: US 9,171,028 B1
(45) Date of Patent: Oct. 27, 2015

(54) METHOD OF MAINTAINING A LARGE SET OF TAINT LABELS

(71) Applicant: GOOGLE INC., Mountain View, CA (US)

(72) Inventors: Peter Cyrus Collingbourne, Mountain View, CA (US); Lorenzo Martignoni, Zurich (CH); Christophe De Canniere, Zurich (CH)

(73) Assignee: GOOGLE INC., Mountain View, CA (US)

( * ) Notice: Subject to any disclaimer, the term of this patent is extended or adjusted under 35 U.S.C. 154(b) by 145 days.

(21) Appl. No.: 13/915,582

(22) Filed: Jun. 11, 2013

(51) Int. Cl.
*G06F 17/30* (2006.01)
(52) U.S. Cl.
CPC .................. *G06F 17/30312* (2013.01)
(58) Field of Classification Search
CPC .................................................... H04L 63/1416
See application file for complete search history.

(56) References Cited

U.S. PATENT DOCUMENTS

| | | | |
|---|---|---|---|
| 7,870,610 B1 | 1/2011 | Mitchell et al. | |
| 7,958,558 B1 * | 6/2011 | Leake et al. | 726/23 |
| 8,127,360 B1 | 2/2012 | Wilhelm et al. | |
| 8,413,240 B2 * | 4/2013 | Katsunuma et al. | 726/23 |
| 2012/0137375 A1 * | 5/2012 | Ramachandran et al. | 726/28 |
| 2012/0210432 A1 * | 8/2012 | Pistoia et al. | 726/25 |
| 2013/0081134 A1 | 3/2013 | Glew et al. | |
| 2013/0117845 A1 * | 5/2013 | Kerschbaumer et al. | 726/22 |

OTHER PUBLICATIONS

Ulf Kargen. "Development of a prototype taint tracing tool for security and other purposes". MA thesis. Linkoping University Department of Computer and Information Science, Jan. 31, 2012.*

(Continued)

*Primary Examiner* — Khanh Pham
(74) *Attorney, Agent, or Firm* — Procopio, Cory, Hargreaves & Savitch LLP

(57) ABSTRACT

A method of maintaining a large set of taint labels for tracking a flow of data through a program is provided, including identifying at least a first data and a second data, associated with a first taint storage element and a second taint storage element, respectively; joining the first taint storage element and the second taint storage element to generate at least one joined taint storage element commonly associated with the first data and the second data; processing the first data and the second data associated with the at least one joined taint storage element through the program from the entry point to an egress point; and defining a condition based on the joined taint storage element at the egress point.

18 Claims, 6 Drawing Sheets

(56) References Cited

OTHER PUBLICATIONS

Enck, W., et al., TaintDroid: An Information-Flow Tracking System for Realtime Privacy Monitoring on Smartphones, 9th USENIX Symposium on Operating Systems Design and Implementation (OSDI' 10), 2011, 19 pgs, Vancouver, BC, Canada, [online] URL: http://appanalysis.org/tdroid10.pdf.

Kim, H C., et al., Capturing Information Flow with Concatenated Dynamic Taint Analysis, 2009 International Conference on Availability, Reliability and Security, 2009, pp. 355-362, Fukuoka, Japan, [online] URL: http://www.cs.columbia.edu/~angelos/Papers/2009/info_track_ieeecs.pdf.

Mysore, S., et al., Understanding and Visualizing Full Systems with Data Flow Tomography, ASPLOS '08, 2008, 11 pgs, Seattle, WA, [online] URL: http://www.cs.ucsb.edu/~sherwood/pubs/ASPLOS-08-systemtomography.pdf.

Memory Sanitizer, Google Project Hosting, 1 pg, [retrieved on Jun. 11, 2013] [online] URL: https://code.google.com/p/memory-sanitizer/.

Shadow Memory, Wikipedia, 1 pg, [retrieved on Jun. 11, 2013] [online] URL: http://en.wikipedia.org/wiki/Shadow_memory.

\* cited by examiner

METHOD OF MAINTAINING A LARGE SET OF TAINT LABELS

BACKGROUND

1. Technical Field

Aspects of the example implementations relate to a method of maintaining a large set of taint labels for dynamically tracking a flow of data through a program or system.

2. Related Art

In the related art, data flows may be traced through a program or a system. For example, when data is input into a program or a system, operations may be performed on that data. The data may then be output, either in its initial form or subject to operations of the program. The output data may be used to assess risk of unauthorized exposure.

Related art tools developed to track the flow of data through a program or a system associate a label or a value with a data point, such that the flow of data from one or more input points (also referred to as "sources") through the one or more egress points (also referred to as "sinks") can be traced. As a result, the flow of data through a program can be traced during design, testing phases, or in-production phases.

For example, a related art dynamic data flow instrumentation pass is provided that associates a shadow value/memory address with each value or memory address used by the program. The associated shadow value or memory address is referred to as a taint label. This technique has been implemented as a compile-time instrumentation pass.

Related art taint label sets are thus represented as bit sets with O(N) storage requirements, where N represents the number of labels. For example, 32-bit taint markings may require 32 separate tags, e.g., for each piece of data that needs to be tracked, one data bit is generated. In the related art, for the data flow tracking tool, shadow memory is allocated in memory. For example, each byte of application memory may correspond to two bytes of shadow memory, which are used to store its taint label. The related art has a minimum space requirement on the order of O(N).

Programs or systems may involve a large number (e.g., hundreds or thousands) of data items which need to be tracked separately. In such programs or systems, the related art O(N) representation quickly dominates the program's memory usage and/or execution time. Accordingly, it becomes impractical to apply the related art dataflow tracking scheme to the programs or systems having a large number of data items, to perform accurate data tracking.

SUMMARY

Aspects of the example implementations include, but are not limited to, a computer-implemented method of tracking a flow of data through a program, that includes identifying at least a first data and a second data, associated with a first taint storage element and a second taint storage element, respectively; joining the first taint storage element and the second taint storage element to generate at least one joined taint storage element commonly associated with the first data and the second data; processing the first data and the second data associated with the at least one joined taint storage element through the program from the entry point to an egress point; and defining a condition based on the joined taint storage element at the egress point.

According to another aspect, a non-transitory computer-readable medium having a set of instructions for tracking a flow of data through a program is provided, the instructions including identifying at least a first data and a second data, associated with a first taint storage element and a second taint storage element, respectively; joining the first taint storage element and the second taint storage element to generate at least one joined taint storage element commonly associated with the first data and the second data; processing the first data and the second data associated with the at least one joined taint storage element through the program from the entry point to an egress point; and defining a condition based on the joined taint storage element at the egress point.

According to a further aspect, a computing device configured for tracking a flow of data is provided, including a data input identifier that identifies at least a first data and a second data, associated with a first taint storage element and a second taint storage element, respectively; a taint storage element generator that joins the first taint storage element and the second taint storage element to generate at least one joined taint storage element commonly associated with the at least the first data and the second data identified by the data input identifier; a data flow processor that processes at least the first data and the second data associated with the at least one joined taint storage element through the program from the entry point to an egress point; an egress condition identifier that defines a condition based on the joined taint storage element at the egress point.

DETAILED DESCRIPTION

Figure 1:
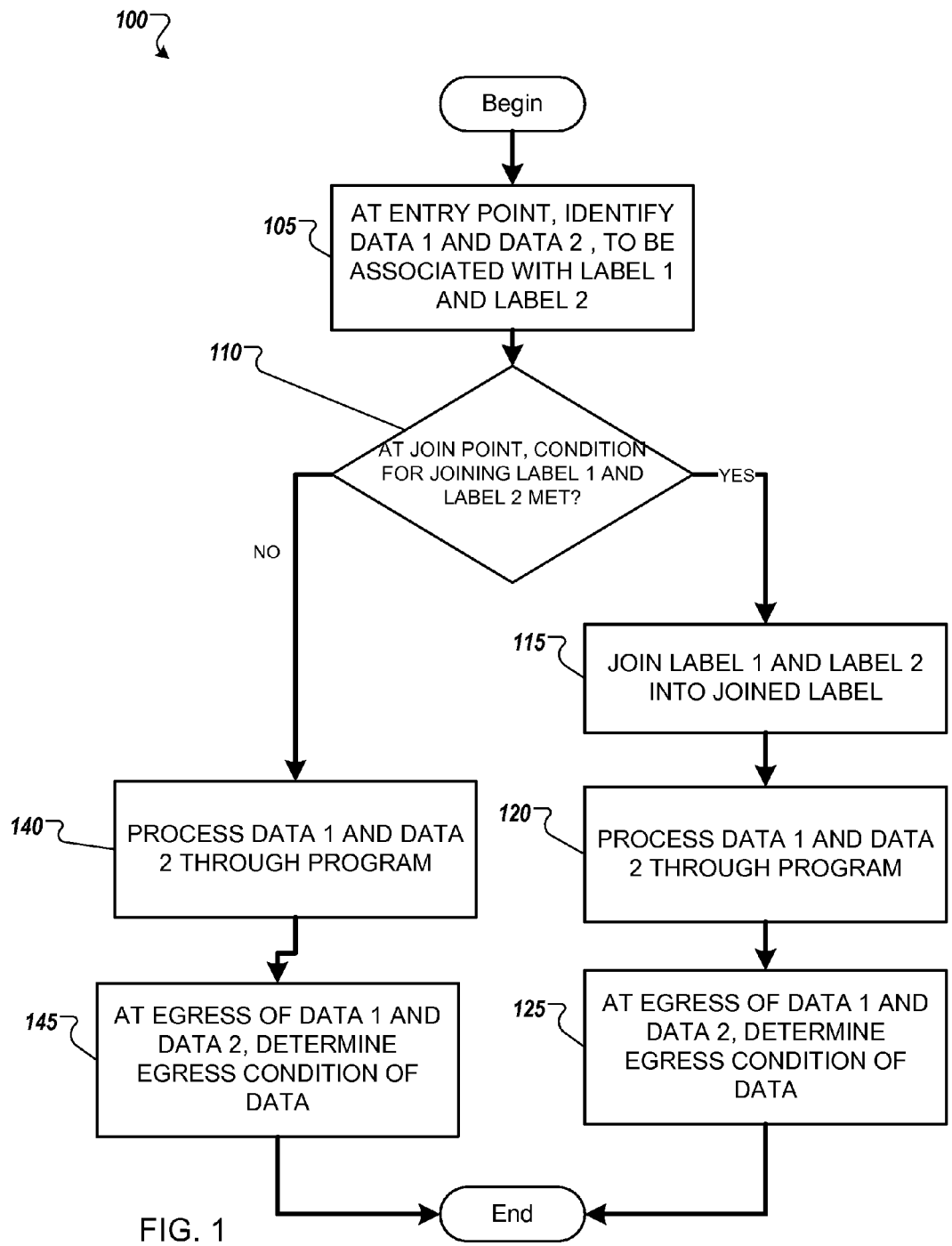
FIG. 1 illustrates a dynamic dataflow tracking process according to an example implementation.

The subject matter described herein is taught by way of example implementations. Various details have been omitted for the sake of clarity and to avoid obscuring the subject matter. The examples shown below are directed to structures and functions for implementing dynamic data flow tracking for large data sets or programs and systems, by maintenance of taint labels. Aspects of the example implementations may relate to e-commerce, information sharing, transaction systems, private information sharing, and secure computing, for example. However, the example implementations are not limited thereto, and may be applied to other fields, without departing from the scope of the present inventive concept.

Aspects of the example implementations are directed to a method of maintaining a large set of taint labels (e.g., taint storage generator) for use in dynamic dataflow processing. More specifically, the example implementations are directed to determining a label set representation that can be employed in large-scale programs and systems, in a manner that may avoid adverse impacts on the storage constraints and performance time for the dynamic dataflow processing of the programs and systems.

According to the example label set representation technique, compression is performed on small bits of data (e.g., data for which no operation is performed). For example, aspects of the example implementations are directed to a label set representation having significantly lower storage requirements for the taint labels (e.g., $O(\log_2 N)$), as compared with the $O(N)$ requirements of the related art.

The example implementation includes a program instrumentation which can associate a number of taint labels with data that is accessible by the program. The accessible data may include, but is not limited to, memory regions, named variables and protocol buffer (protobuf) fields. For example, a string may be used to create a label (i.e., integer), and may be derived from an HTML tag, a name of a field, a part of the code, the source of the data, the name of the database, the query to retrieve the data, or other format, as would be understood by those skilled in the art. Further, the data may be associated with an internet protocol (IP) address of a user, an address, a location of a device (e.g., physical location), or other identifying information. The analysis is performed on a dynamic basis.

For example, but not by way of limitation, the program instrumentation may operate on a running program, and may track how the labels propagate through the program as it is running. According to the example implementation, a large (e.g., >100) number of labels is supported, including, but not limited to, programs that handle a large number of protobuf fields (for example, some programs may contain hundreds of fields), or multiple protobufs.

In a low level interface of the example implementation, one or more functions are provided that create taint labels, attach the taint labels to memory regions, and extract the set of labels associated with a specific memory region. These functions of the low level interface are used to implement the high level interface.

In the high level interface, a mechanism is provided to attach different labels to all fields in a given protobuf, and produce reports regarding which fields of a given protobuf originated from which fields of any other protobuf. This mechanism can be applied to any source of data, such as HTTP headers, and others described above. This mechanism can be implemented for one or more languages (e.g., C++, Java, Go, Python).

A generic mechanism is provided to attach labels to function parameters, return values (e.g., sources), and define locations where those labels are monitored or checked (e.g., sinks). The location of the sources and sinks may be defined by a configuration file.

FIG. 1 illustrates an example implementation of a dynamic dataflow tracking process 100. As shown at 105, at an entry point to the program or system (e.g., user input of data, or data received from another online system), an identification process is performed. More specifically, individual data that may be associated with individual taint labels is identified.

In 110, at a join point, a determination is made as to whether a condition for joining the first taint label and the second taint label has been met. A join point may be any arithmetic operation with two or more operands, such as addition, for example. Further, a condition may be that both labels are nonzero and are not equal to each other. Additionally, optimizations may be implemented to detect cases where one label subsumes another, such that the subsuming label can be reused.

If the condition has been met, a join operation is performed on the selected taint labels, and a joined label is generated. Further details of the join process are disclosed in FIG. 2, and explained further below.

In the example implementation, the joined taint label can be used to track more than one piece of data (e.g., read data from a file, or read data from a database), while referencing the origins of the multiple pieces of data. The joined taint label is an integer, which accesses an array that stores the information about the joined taint label. By accessing the information in the array, the data can be retrieved. Alternatively, the individual labels that form the origin of the joined taint label can also be accessed. For example, but not by way of limitation, a recursive lookup may be employed to find all labels associated with a given label.

According to an example implementation, the representation of a joined taint label is a 16-bit integer, and new taint labels are allocated sequentially from a pool. However, the example implementation is not limited thereto, and taint labels of other sizes may be substituted therefor, depending on system architecture, system performance requirements and the like.

For example, but not by way of limitation, a taint label having an 8-integer or a 32-bit integer size may be used, instead of a 16-bit integer. This variation allows for more or fewer labels to be represented. Representing more union labels may be necessary in an environment where labels must frequently be unioned. Representing fewer labels may be necessary in memory constrained environments.

At 120, the processes of the program are performed on the identified data. These processes represent the instructions or functions or routines, or other programs and processes well known in the art with respect to the operation of a computer program. In the software development process, this process may be performed at the compiler operation phase, so that a programmer or tester may be able to use the joined taint label to follow the data from the input to the egress.

The example implementations are not limited thereto, and other aspects associated with the operation of the computer program may be employed. For example, the process may be employed as troubleshooting during runtime operation, or testing for data flow based on changes, upgrades or the like to an existing program or system.

At 125, the egress point or points of the identified data are monitored for the existence of a condition of the data. Further, the egress condition may be met based on the existence of a taint identifier associated with the data. For example, the presence of data as measured by the egress condition at a given egress point, may indicate that data is present at an egress point at which data should not be present. Based on this determination, a troubleshooting operation may be performed that allows for the program or system to be analyzed in a manner that traces the data to the point at which the data is directed to the given egress point. For example, shadow data may be reviewed at the egress point to generate a report. A report may include information about the source of the data, which may be derived from all labels associated with the data. This might include a name of a field, a part of the code, the source of the data, the name of the database, the query to retrieve the data, etc.

Optionally, changes may be made in the program or system to adjust the data flow, and the example implementation may be run to determine that the data is no longer directed to the given egress point.

On the other hand, if it is determined at the join point in 110 that the condition for joining the taint labels has not been met, the process is performed with the taint labels that are associated with the specific data elements, and processing and condition identification are performed at 140-145. It should be noted that the association between label 1 and data 1, and label 2 and data 2, at 105 above.

Figure 2:
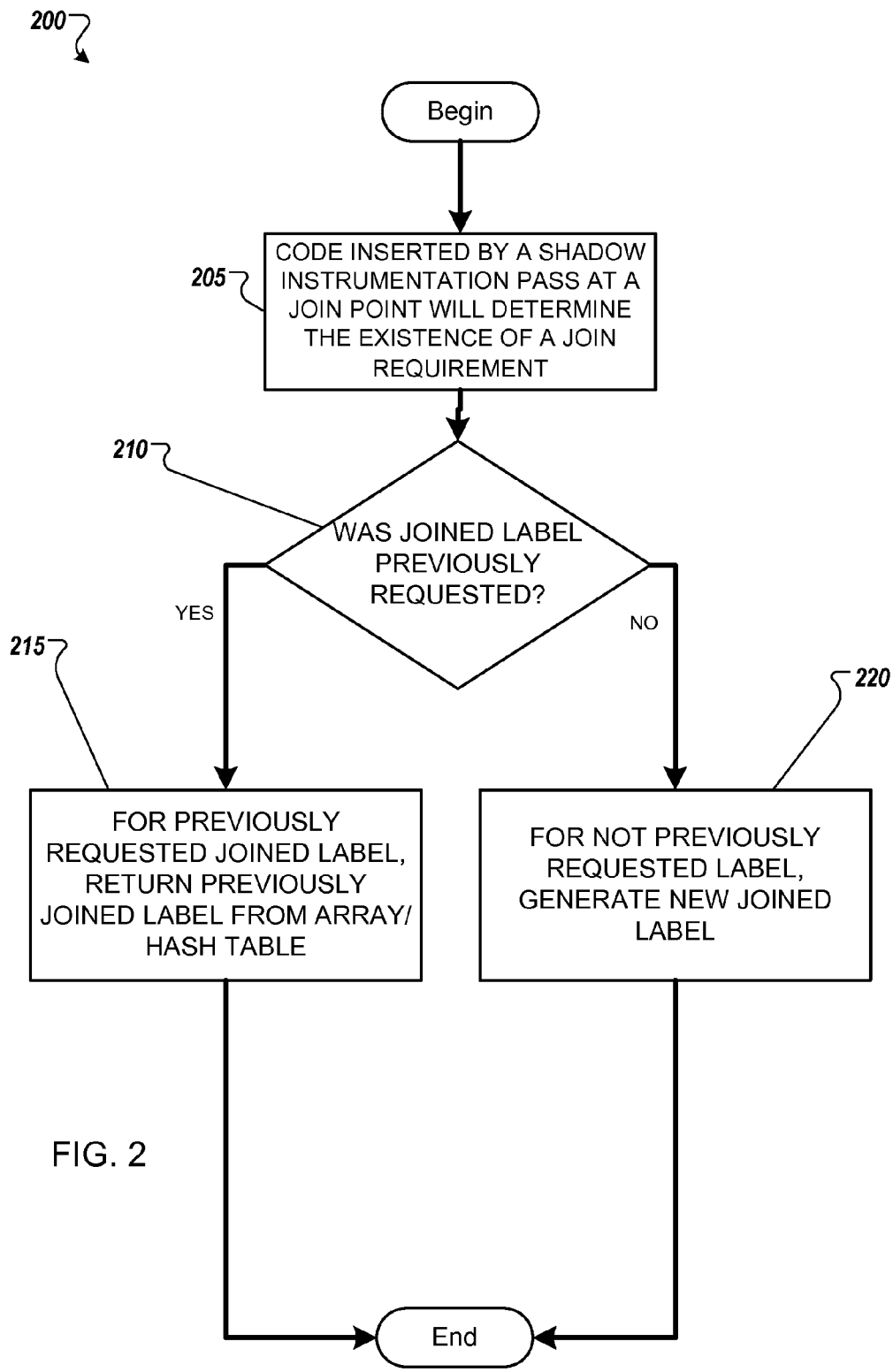
FIG. 2 illustrates generation of a joined label according to an example implementation.

FIG. 2 illustrates a process 200 of generating a joint label according to an example implementation. More specifically, at 205, code inserted by a shadow instrumentation pass at a join point will determine the existence of a join requirement.

The code inserted by a shadow instrumentation pass is required to join multiple labels together at join points, such as an arithmetic add operation, where the shadow values for the two operands must be joined to form the shadow value for the result. For example, the shadow of the two operands individually must accurately reflect the shadow of the two numbers as added together. While the example of an arithmetic add operation is provided as an example join point, other join points may be substituted therefor without departing from the scope of the inventive concept, as would be understood by those skilled in the art.

When a label union operation is requested at a join point, the code checks whether a union is required, and whether the same union has been requested before. If so, it returns the previously allocated union label. If not, it allocates a new union label from the same pool used for new labels.

For example, but not by way of limitation, where each data is represented as a bit in a vector, a shadow propagation operation would be used to perform a logical OR operation, and generate a bit vector for that operation.

The instrumentation may be implemented as an infrastructure pass, and may support a variety of languages associated with an infrastructure (e.g., LLVM, Low Level Virtual Machine), including but not limited to:

C family languages, e.g., using Clang
Java, e.g., using Shark
Go, e.g., using GCC and DragonEgg
Languages implemented using a C family interpreter (e.g. CPython)

Additionally, Android may be supportable by compiling individual apps or a whole system approach, e.g. for a system emulator that runs unmodified guest operating systems on a host OS, where the guest and host central processing unit (CPU) architecture can be different (e.g., Windows guest on a Linux host).

Although LLVM is disclosed as an example infrastructure, other infrastructures may be substituted therefor, without departing from the scope of the example implementations. For example, Valgrind or DynamoRIO may be used as the infrastructure, and may be advantageous where language independence and ability to avoid the need to recompile are desired, and speed of instrumentation is not a critical factor.

At 210, a determination is made as to whether the joined label to be generated has previously been requested. If it is determined that the joined label was previously requested, then at 215, for the previously requested joined label, an array is accessed to return the previously joined label. However, if the requested label was not previously requested, then at 220, a new joined label is generated.

For each label union operation, as process as disclosed in the following pseudocode may be performed:

if (likely(get_label(v1)==get_label(v2)))
use get_label(v1);
else
use_union(get_label(v1), get_label(v2));

Further, _union is a runtime library function, which may be defined as follows:

_label_union(_label 11, _label 12) {
if (_union_table[11][12]!=0)
return _union_table[11][12];
_union_table[11][12]=++_label_count;
//Create mapping from _label_count to (11, 12)
return_label_count;
}

_union_table is a large 2D array ($2^{16}*2^{16}$ elements). The OS kernel will not reserve storage for this (sparse) array until required.

It should be noted that _label_count represents the number of labels created at that point (i.e., the value of the latest used tainted label), _label describes a label, _union_table and _union respectively store the taint label and the function to compute the union.

Accordingly, the CPU caches and the memory management unit (MMU) acts as a fast lookup table for this function. The label lookup table is used to reconstruct the set of individual labels included in a given label set, and can optionally be used by _union to minimize the number of labels created, by checking whether one of a given pair of labels to union subsumes the other, and if so returning the former. Due to the size of the array, a 64-bit environment will be required. Additionally, alternative representations of _union_table are possible. For example, but not by way of limitation, a hash table may be implemented as a more compact representation of the union table.

As for static single assignment (SSA) registers, instead of associating a label with each byte or bit of data, labels are associated directly with registers. Loads result in a union of shadow labels corresponding to bytes loaded (which is short circuited by the initial comparison in most instances), and stores result in a copy of the label to the shadow of all stored bytes stored.

Figure 3:
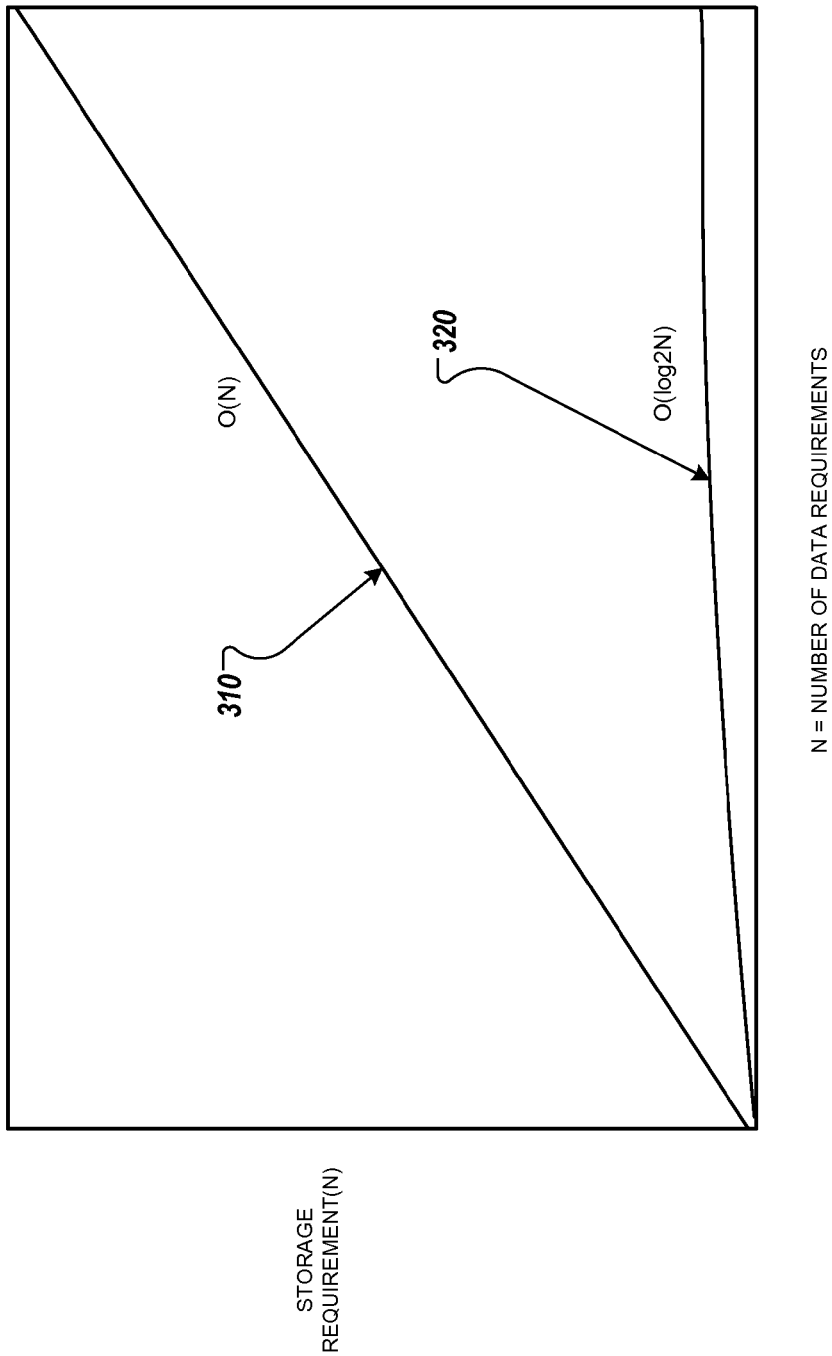
FIG. 3 illustrates a relationship between the related art storage requirements for a given number of data inputs, as compared with the storage requirements according to the example implementation.

FIG. 3 illustrates a difference between the storage requirements of the related art 310 and the storage requirements of the example implementations 320. As explained above, the example implementation tracks a large number of taint labels. Because the related art multiple-label tainting systems assign one label per bit to shadow storage, and union taint labels use a bitwise-or operation, the related art cannot scale to programs or systems which use hundreds or thousands of taint labels, as the label union operation becomes O(N) in the number of supported labels, and the associated data associated will quickly dominate the live variable set, causing register spills and hampering performance.

Accordingly, for the example implementation, a low overhead approach is used which may be $O(\log_2 N)$ during execution. Because most applications are copying data from one location to another location, the required space for label unions is sparse. Therefore, the need for a union operation would be relatively rare. Accordingly, the example implementations reduce the storage requirements for data flow tracing. For example, the use of the foregoing example implementations may result in a storage requirement as low as $O(\log_2 N)$, as compared with the related art requirements of O(N), such as in a scenario in which no union operations are required.

Figure 4:
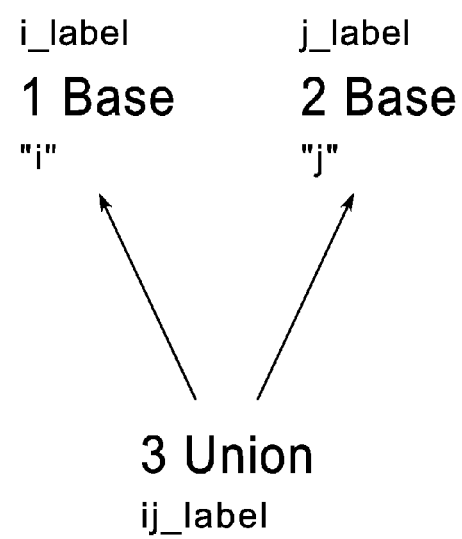
FIG. 4 illustrates an example of the operation of the dynamic dataflow tracking process according to the example implementation.

FIG. 4 illustrates an example of a flow of data through a program or system, as implemented based on the example implementations. The foregoing may be used in a variety of applications. For example, according to one example application, the mechanism is used by a privacy analysis tool to carry out specific experiments. More specifically, a program run results in a report indicating which sources reached which sinks (e.g., sinks associates with respective sources). To assist privacy analysts, a standard set of sources/sinks may be defined for a given application or program.

As an example join creation, the following example code is provided, and associated with the unions as generated in FIG. 4:

int main(void) {
int i=1;
label i_label=_create_label("i", 0);

```
_set_label(i_label, &i, sizeof(i));
int j=2;
label j_label=_create_label("j", 0);
_set_label(j_label, &j, sizeof(j));
label ij_label=_get_label(i+j);
assert(_has_label(ij_label, i_label));
assert(_has_label(ij_label, j_label));
return 0;
}
```

In the foregoing code, the _create_label function is used to create a base label, the _set_label function is used to assign a label to a variable, the _get_label function is used to retrieve the label associated with a given expression and the _has_label function checks for the presence of a base label within a union label. Firstly, two base labels 1, 2 are created and respectively assigned to the variables i, j. A union label 3 for labels 1 and 2 is then created during the evaluation of the expression i+j. The code then checks that union label 3 subsumes labels 1 and 2.

For example, the example implementation may be implemented for purpose-sharing in a large-scale program or system, and be associated with a particular code base. Thus, the code can be analyzed and understood within the context of large programs, to understand data flow and sharing of data.

As an example of joining, a program may take a set of flags indicating whether the user has performed a set of specific actions (e.g. two of those actions might be that the user has agreed to a terms of service and that the user has agreed to a privacy policy), and compute a combined flag indicating whether the user has performed all required actions (e.g., the combined flag might have a label representing the union of the agreed-to-terms-of-service and agreed-to-privacy-policy labels).

Example Processing Environment

Figure 5:
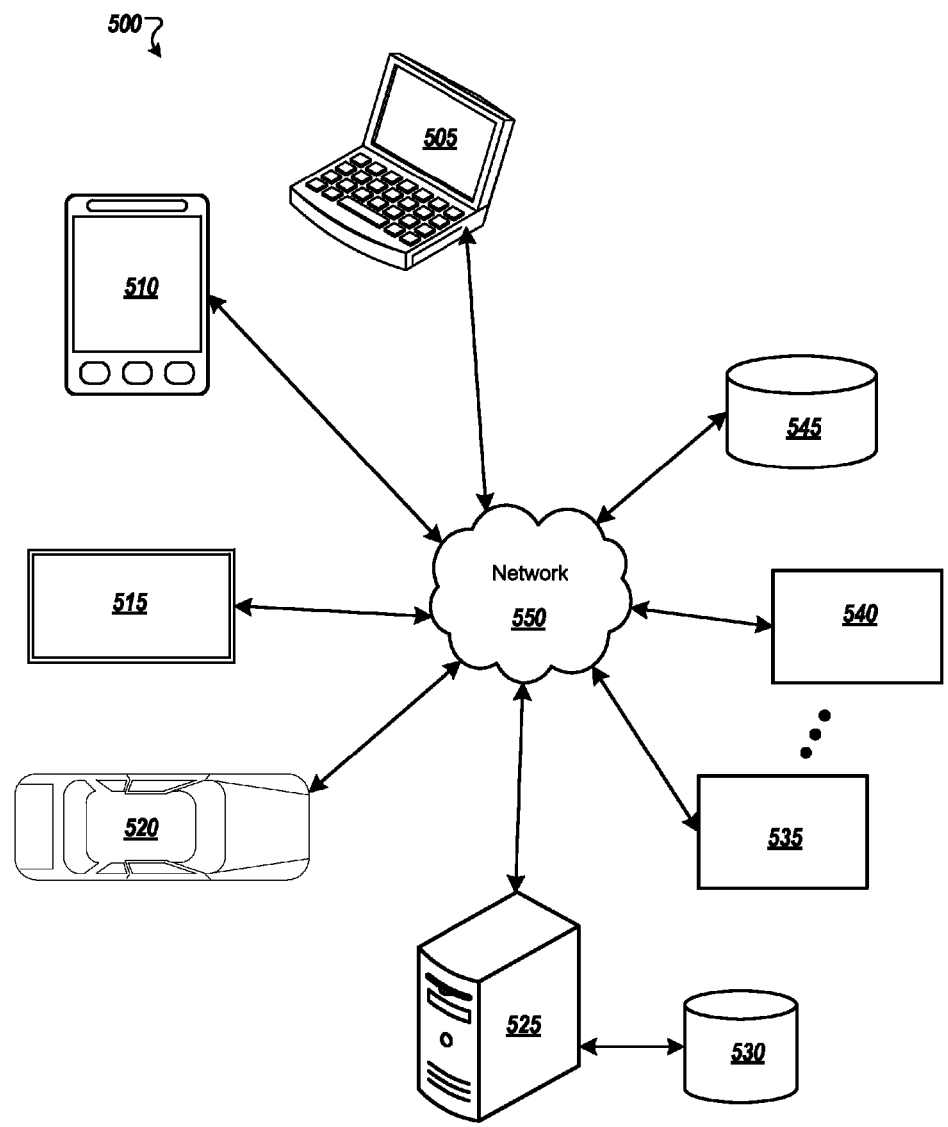
FIG. 5 illustrates an example processing environment according to the example implementation.

FIG. 5 shows an example online environment in which some example implementation may be implemented. Environment 500 includes devices 505-545, each is communicatively connected to at least one other device via, for example, network 550. Some devices may be communicatively connected to one or more storage devices 530 and 545 (e.g., via device 525).

An example of one or more devices 505-550 may be computing device 605 described below in FIG. 6. Devices 505-550 may include, but are not limited to, a computer 525 (e.g., personal or commercial), a device associated with a vehicle 520, a mobile device 510 (e.g., smartphone), a television 515, a mobile computer 505, a server computer 550, computing devices 535-540, storage devices 530, 545. Any of devices 505-550 may access one or more services from and/or provide one or more services to one or more devices shown in environment 500 and/or devices not shown in environment 500.

A user may control a device, for example, the device 115, to input data associated with a joined taint label via network 550, and compile or run the program via network 550. Egress information associated with the joined taint label may be stored at storage device 530 or 545, respectively, for example.

Example Computing Environment

Figure 6:
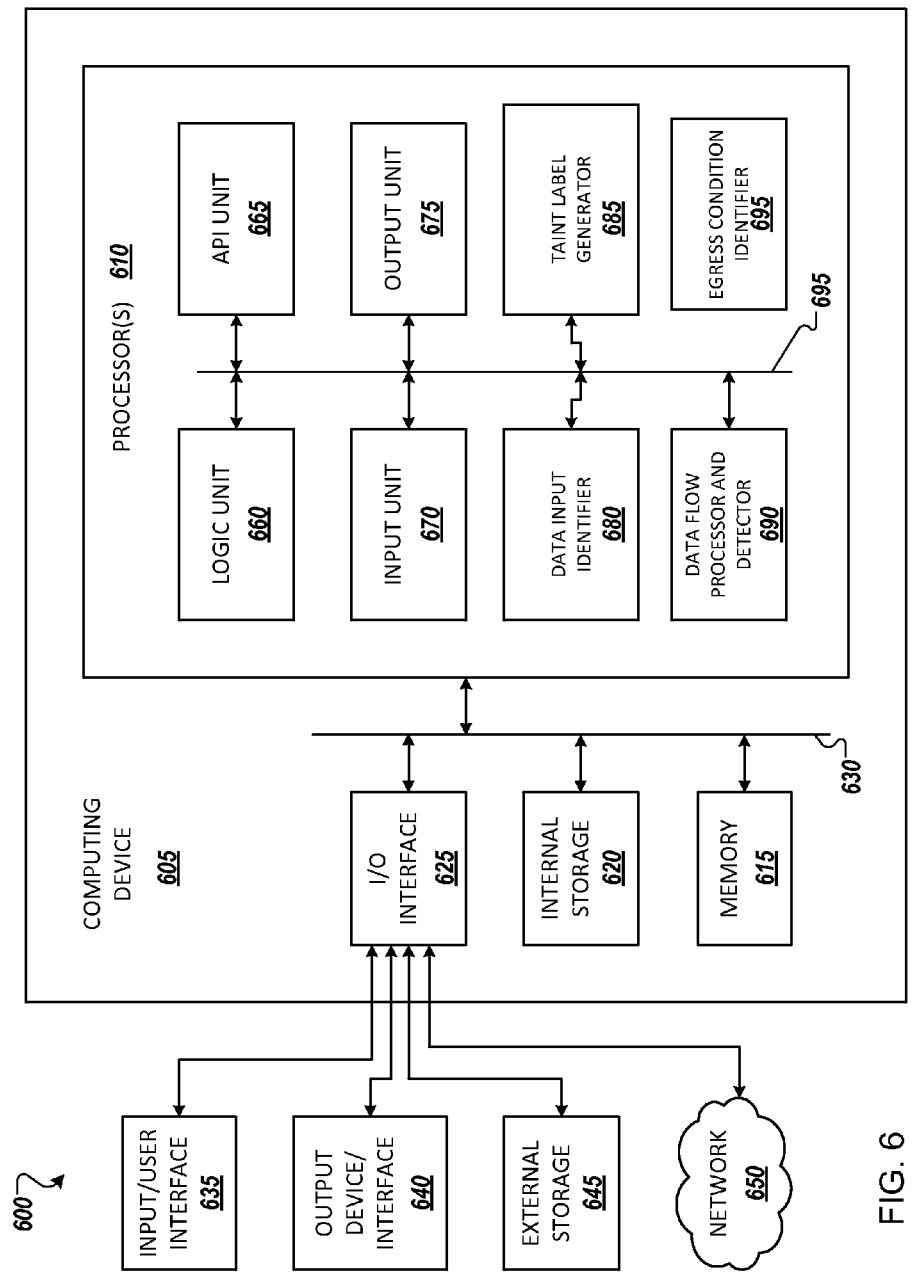
FIG. 6 shows an example computing environment with an example computing device suitable for use in some example implementations.

FIG. 6 shows an example computing environment with an example computing device suitable for use in some example implementations. Computing device 605 in computing environment 600 can include one or more processing units, cores, or processors 610, memory 615 (e.g., RAM, ROM, and/or the like), internal storage 620 (e.g., magnetic, optical, solid state storage, and/or organic), and/or I/O interface 625, any of which can be coupled on a communication mechanism or bus 630 for communicating information or embedded in the computing device 605. The computing device 605 may represents a device that may be under the control of a programmer or developer for the program or system.

Computing device 605 can be communicatively coupled to input/user interface 635 and output device/interface 640. Either one or both of input/user interface 635 and output device/interface 640 can be a wired or wireless interface and can be detachable. Input/user interface 635 may include any device, component, sensor, or interface, physical or virtual, that can be used to provide input (e.g., buttons, touch-screen interface, keyboard, a pointing/cursor control, microphone, camera, braille, motion sensor, optical reader, and/or the like).

Output device/interface 640 may include a display, television, monitor, printer, speaker, braille, or the like. In some example implementations, input/user interface 635 and output device/interface 640 can be embedded with or physically coupled to the computing device 605. In other example implementations, other computing devices may function as or provide the functions of input/user interface 635 and output device/interface 640 for a computing device 605.

Examples of computing device 605 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 605 can be communicatively coupled (e.g., via I/O interface 625) to external storage 645 and network 650 for communicating with any number of networked components, devices, and systems, including one or more computing devices of the same or different configuration. Computing device 605 or any connected computing device can be functioning as, providing services of, or referred to as a server, client, thin server, general machine, special-purpose machine, or another label.

I/O interface 625 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 600. Network 650 can be any network or combination of networks (e.g., the Internet, local area network, wide area network, a telephonic network, a cellular network, satellite network, and the like).

Computing device 605 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 605 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 610 can execute under any operating system (OS) (not shown), in a native or virtual environment. One or more applications can be deployed that include logic unit 660, application programming interface (API) unit 665, input unit 670, output unit 675, data input identifier 680, taint label generator 685, dataflow processor and detector 690, and egress condition identifier 690 for the different units to communicate with each other, with the OS, and with other applications (not shown). For example, data input identifier 680, taint label generator 685, dataflow processor and detector 690, and egress condition identifier 690 may implement one or more processes shown in FIGS. 1-2. The described units and elements can be varied in design, function, configuration, or implementation and are not limited to the descriptions provided.

In some example implementations, when information or an execution instruction is received by API unit 665, it may be communicated to one or more other units (e.g., logic unit 660, input unit 670, output unit 675, data input identifier 680, taint label generator 685, dataflow processor and detector 690, and egress condition identifier 690). For example, input unit 670 receives an input data and, via API unit 665, communicates with data input identifier 680 to identify the data that may be associated with the taint label. Data input identifier 680 interacts with taint label generator 685 to generate a taint label based on the data, such as a joined taint label. Further, data flow processor and detector 690 performs the operations of the program or system that are run on the data, and egress condition identifier 695 determines the existence of each addition at one or more egress points, based on the data flow through the program or system, and the associated joined taint label.

In some instances, logic unit 660 may be configured to control the information flow among the units and direct the services provided by API unit 665, input unit 670, output unit 675, data input identifier 680, taint label generator 685, dataflow processor and detector 690, and egress condition identifier 690 in some example implementations described above. For example, the flow of one or more processes or implementations may be controlled by logic unit 660 alone or in conjunction with API unit 665.

The present example implementations may have various benefits and advantages. For example, but not by way of limitation, the space/time requirement may be reduced. As a result, complex applications may be run in a reasonable amount of time, for example in a testing or development environment of a large-scale program or system. Further, according to the example implementations, the instrumentation may be run either directly in production, or against a mirror of live traffic.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer-implemented method of tracking a flow of data through a program, comprising:

identifying at least a first data and a second data, associated with a first taint storage element and a second taint storage element, respectively;

joining the first taint storage element and the second taint storage element to generate at least one joined taint storage element commonly associated with the first data and the second data, wherein the generation of the at least one joined taint storage element is conducted in accordance with a relationship between a storage requirement of the at least one joined taint storage element and the first data and the second data;

wherein the relationship between a storage requirement of the at least one joined taint storage element and the first data and the second data comprises $O(\log_2 N)$, where N represents a number associated with a storage requirement for the at least one joined taint storage element, the first taint storage element and the second taint storage element of the at least the first data and the second data when a union operation is not required;

processing the first data and the second data associated with the at least one joined taint storage element through the program from an entry point to an egress point; and defining a condition based on the joined taint storage element at the egress point.

2. The computer-implemented method of claim 1, the joining further comprising:

performing a shadow instrumentation pass at a join point to determine that the joining is required based on an operation to be performed on the first data and the second data in the program.

3. The computer-implemented method of claim 2, wherein:

when it is determined that the joining is required, determining whether the at least one joined taint storage element was previously requested;

if the at least one joined taint storage element was previously requested, generating the at least one joined taint storage element by returning the previously requested joined taint storage element; and if the at least one joined taint storage element was not previously requested, allocating the at least one joined taint storage element as a new joined taint storage element.

4. The computer-implemented method of claim 3, wherein the previously requested joined taint storage element comprises one of an indexed lookup table stored as an array and a hash table.

5. The computer-implemented method of claim 4, wherein a size of the array is at least $2^{16} \times 2^{16}$ elements.

6. The computer-implemented method of claim 1, wherein the joined taint storage element comprises an integer having a size of one of 8 bits, 16 bits, and 32 bits.

7. The computer-implemented method of claim 1, wherein the identifying is performed at the entry point of the program, where the at least the first data and the second data initially are accessed by the program.

8. A non-transitory computer-readable medium having a set of instructions for tracking a flow of data through a program, the instructions comprising:

identifying at least a first data and a second data, associated with a first taint storage element and a second taint storage element, respectively;

joining the first taint storage element and the second taint storage element to generate at least one joined taint storage element commonly associated with the first data and the second data, wherein the generation of the at least one joined taint storage element is conducted in accordance with a relationship between a storage requirement of the at least one joined taint storage element and the first data and the second data;

wherein the relationship between the storage requirement of the at least one joined taint storage element and the first data and the second data comprises $O(\log_2 N)$, where N represents a number associated with a storage requirement for the at least one joined taint storage element, the first taint storage element and the second taint storage element of the at least the first data and the second data when a union operation is not required;

processing the first data and the second data associated with the at least one joined taint storage element through the program from an entry point to an egress point; and defining a condition based on the joined taint storage element at the egress point.

9. The non-transitory computer-readable medium of claim 8, the joining further comprising:

performing a shadow instrumentation pass at a join point to determine that the joining is required based on an operation to be performed on the first data and the second data in the program.

10. The non-transitory computer-implemented method of claim 9, wherein:

when it is determined that the joining is required, determining whether the at least one joined taint storage element was previously requested;

if the at least one joined taint storage element was previously requested, generating the at least one joined taint storage element by returning the previously requested joined taint storage element; and if the at least one joined taint storage element was not previously requested, allocating the at least one joined taint storage element as a new joined taint storage element.

11. The non-transitory computer-readable medium of claim 10, wherein the previously requested joined taint storage element comprises one of an indexed lookup table stored as an array and a hash table.

12. The non-transitory computer-readable medium of claim 11, wherein a size of the array is at least $2^{16} \times 2^{16}$ elements.

13. The non-transitory computer-readable medium of claim 8, wherein the joined taint storage element comprises an integer having a size of one of 8 bits, 16 bits, and 32 bits.

14. The non-transitory computer-readable medium of claim 8, wherein the identifying is performed at the entry point of the program, where the at least the first data and the second data initially are accessed by the program.

15. A computing device configured for tracking a flow of data, comprising:

a data input identifier that identifies at least a first data and a second data, associated with a first taint storage element and a second taint storage element, respectively;

a taint storage element generator that joins the first taint storage element and the second taint storage element to generate at least one joined taint storage element commonly associated with the at least the first data and the second data identified by the data input identifier, wherein the generation of the at least one joined taint storage element is conducted in accordance with a relationship between a storage requirement of the at least one joined taint storage element and the first data and the second data;

wherein the relationship between the storage requirement of the at least one joined taint storage element and the first data and the second data comprises $O(\log_2 N)$, where N represents a number associated with a storage requirement for the at least one joined taint storage element, the first taint storage element and the second taint storage element of the at least the first data and the second data when a union operation is not required;

a data flow processor that processes at least the first data and the second data associated with the at least one joined taint storage element through the program from an entry point to an egress point;

an egress condition identifier that defines a condition based on the joined taint storage element at the egress point.

16. The computing device of claim 15, where the taint storage element generator performs a shadow instrumentation pass at a join point to determine that the joining is required based on an operation to be performed on the first data and the second data in the program, and when it is determined that the joining is required, determines whether the at least one joined taint storage element was previously requested;

if the at least one joined taint storage element was previously requested, generates the at least one joined taint storage element by returning the previously requested joined taint storage element; and if the at least one joined taint storage element was not previously requested, allocates the at least one joined taint storage element as a new joined taint storage element.

17. The computing device of claim 16, wherein the previously requested joined taint storage element comprises one of an indexed lookup table stored as an array.

18. The computing device of claim 15, wherein the data input identifier performs the identifying at the entry point of the program, where the at least the first data and the second data initially are accessed by the program.

\* \* \* \* \*